United States Patent
Sham

(10) Patent No.: US 10,354,521 B2
(45) Date of Patent: *Jul. 16, 2019

(54) FACILITATING LOCATION POSITIONING SERVICE THROUGH A UAV NETWORK

(71) Applicant: Wellen Sham, Taipei (TW)

(72) Inventor: Wellen Sham, Taipei (TW)

(73) Assignee: Wellen Sham, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,483

(22) Filed: Sep. 27, 2017

(65) Prior Publication Data

US 2018/0033298 A1  Feb. 1, 2018

Related U.S. Application Data

(63) Continuation of application No. 15/341,831, filed on Nov. 2, 2016, now Pat. No. 9,786,165.

(Continued)

(51) Int. Cl.
*G08G 1/017* (2006.01)
*G05D 1/00* (2006.01)
(Continued)

(52) U.S. Cl.
CPC ......... *G08G 1/0175* (2013.01); *B64C 39/024* (2013.01); *B64D 47/08* (2013.01);
(Continued)

(58) Field of Classification Search
CPC ...... G08G 1/0175; B60W 30/02; B25J 9/163; G01S 7/417; G05D 1/0265; G05D 1/104;
(Continued)

(56) References Cited

U.S. PATENT DOCUMENTS

| 6,958,676 B1 | 10/2005 | Morgan et al. |
| 7,885,548 B1 | 2/2011 | Nelson et al. |

(Continued)

FOREIGN PATENT DOCUMENTS

WO   2010/089738 A2   8/2010

OTHER PUBLICATIONS

European Search Report for EP 16 20 6286 dated May 24, 2017, all pages.

(Continued)

*Primary Examiner* — Yuri Kan
(74) *Attorney, Agent, or Firm* — Kilpatrick Townsend & Stockton LLP

(57) ABSTRACT

Embodiments are provided for providing location positioning service for locating a transportation apparatus through a UAV network. A location center may be employed to receive a location service request for locating a specific transportation apparatus. After receiving such a request, the location center may inquire a location database for last known location of the requested transportation apparatus. Based on the last known location of the requested transportation apparatus, the location center may predict one or more areas in which the requested transportation apparatus may be currently in. Based on the prediction, the location center may be configured to generate one or more control instructions to one or more UAVs in the UAV network to locate the requested transportation apparatus in those areas.

16 Claims, 5 Drawing Sheets

Related U.S. Application Data

(60) Provisional application No. 62/274,112, filed on Dec. 31, 2015.

(51) Int. Cl.

| | |
|---|---|
| *B60W 30/02* | (2012.01) |
| *H04M 11/04* | (2006.01) |
| *B64C 39/02* | (2006.01) |
| *B64D 47/08* | (2006.01) |
| *G05D 1/10* | (2006.01) |
| *G06K 9/00* | (2006.01) |
| *G08G 1/01* | (2006.01) |
| *G08G 1/04* | (2006.01) |
| *G08G 5/00* | (2006.01) |
| *H04L 29/06* | (2006.01) |
| *G01S 5/16* | (2006.01) |
| *G01S 13/74* | (2006.01) |
| *G06F 16/00* | (2019.01) |

(52) U.S. Cl.
CPC ............... *G01S 5/16* (2013.01); *G01S 13/74* (2013.01); *G05D 1/104* (2013.01); *G06F 16/00* (2019.01); *G06K 9/0063* (2013.01); *G08G 1/012* (2013.01); *G08G 1/04* (2013.01); *G08G 5/0013* (2013.01); *G08G 5/0069* (2013.01); *G08G 5/0078* (2013.01); *G08G 5/0095* (2013.01); *H04L 65/1069* (2013.01); *B64C 2201/12* (2013.01)

(58) Field of Classification Search
CPC . G05D 1/00; H04W 4/22; H04W 4/90; G01C 21/26; H04L 67/12; H04M 11/04
See application file for complete search history.

(56) References Cited

U.S. PATENT DOCUMENTS

| | | | |
|---|---|---|---|
| 8,503,941 B2 | 8/2013 | Erdos et al. | |
| 8,527,146 B1 | 9/2013 | Jackson et al. | |
| 8,717,436 B2 | 5/2014 | Heminghous et al. | |
| 8,970,694 B2 | 3/2015 | Dunkel et al. | |
| 9,022,324 B1 | 5/2015 | Abhyanker | |
| 9,056,676 B1 | 6/2015 | Wang | |
| 9,070,289 B2* | 6/2015 | Saund ................... G08G 1/054 |
| 9,148,215 B1 | 9/2015 | Bonawitz | |
| 9,164,506 B1 | 10/2015 | Zang | |
| 9,170,117 B1 | 10/2015 | Abuelsaad et al. | |
| 9,307,383 B1* | 4/2016 | Patrick ................... H04W 4/90 |
| 9,313,242 B2 | 4/2016 | Mann et al. | |
| 9,313,667 B1 | 4/2016 | Daoura | |
| 9,466,161 B2 | 10/2016 | Ricci | |
| 9,489,839 B2 | 11/2016 | Nerayoff et al. | |
| 9,590,298 B1 | 3/2017 | Buchmueller et al. | |
| 9,786,165 B2 | 10/2017 | Sham | |
| 9,800,321 B2 | 10/2017 | Sham | |
| 9,826,256 B2 | 11/2017 | Sham | |
| 10,073,449 B1* | 9/2018 | Sait ........................ H04L 67/12 |
| 2003/0200398 A1 | 10/2003 | Harris | |
| 2007/0080813 A1 | 4/2007 | Melvin | |
| 2007/0250260 A1 | 10/2007 | Ariyur et al. | |
| 2008/0018730 A1 | 1/2008 | Roth | |
| 2008/0249857 A1 | 10/2008 | Angell et al. | |
| 2010/0031284 A1 | 2/2010 | Miyaki | |
| 2010/0036717 A1 | 2/2010 | Trest | |
| 2010/0085236 A1 | 4/2010 | Franceschini et al. | |
| 2010/0179878 A1 | 7/2010 | Dawson et al. | |
| 2010/0293033 A1 | 11/2010 | Hall et al. | |
| 2011/0292160 A1 | 12/2011 | Shitrit | |
| 2012/0054028 A1 | 3/2012 | Tengler et al. | |
| 2012/0089462 A1 | 4/2012 | Hot | |
| 2012/0122418 A1 | 5/2012 | Hicks, III | |
| 2013/0210461 A1 | 8/2013 | Moldavsky et al. | |
| 2013/0273839 A1 | 10/2013 | Breshears | |
| 2013/0317680 A1* | 11/2013 | Yamamura ........... G05D 1/0265 701/22 |
| 2013/0328997 A1 | 12/2013 | Desai | |
| 2014/0241239 A1 | 8/2014 | Chang | |
| 2014/0309806 A1 | 10/2014 | Ricci | |
| 2014/0309813 A1 | 10/2014 | Ricci | |
| 2014/0336848 A1 | 11/2014 | Saund et al. | |
| 2014/0344062 A1 | 11/2014 | LaMont | |
| 2015/0049192 A1 | 2/2015 | Hooton | |
| 2015/0062339 A1 | 3/2015 | Ostrom | |
| 2015/0070516 A1 | 3/2015 | Shoemake et al. | |
| 2015/0092020 A1 | 4/2015 | Vaughn | |
| 2015/0127460 A1 | 5/2015 | Daub et al. | |
| 2015/0134143 A1 | 5/2015 | Willenborg | |
| 2015/0140954 A1* | 5/2015 | Maier ..................... H04W 4/22 455/404.2 |
| 2015/0146579 A1 | 5/2015 | Teller et al. | |
| 2015/0204974 A1 | 7/2015 | Pillay | |
| 2015/0257081 A1 | 9/2015 | Ramanujan et al. | |
| 2015/0280810 A1 | 10/2015 | Beals et al. | |
| 2015/0325268 A1 | 11/2015 | Berger et al. | |
| 2016/0019458 A1* | 1/2016 | Kaufhold ................. G01S 7/417 342/25 F |
| 2016/0078759 A1 | 3/2016 | Nerayoff et al. | |
| 2016/0116291 A1* | 4/2016 | Chien .................... G01C 21/26 701/519 |
| 2016/0199034 A1 | 7/2016 | Labyed et al. | |
| 2016/0271796 A1* | 9/2016 | Babu ........................ B25J 9/163 |
| 2016/0272196 A1* | 9/2016 | Hocking ............... B60W 30/02 |
| 2016/0285864 A1 | 9/2016 | Canavor et al. | |
| 2016/0363929 A1 | 12/2016 | Clark et al. | |
| 2017/0039424 A1 | 2/2017 | Nerayoff et al. | |
| 2017/0041763 A1 | 2/2017 | Jalali | |
| 2017/0193556 A1 | 7/2017 | Sham | |
| 2017/0195048 A1 | 7/2017 | Sham | |
| 2017/0353229 A1 | 12/2017 | Sham | |
| 2018/0033298 A1 | 2/2018 | Sham | |
| 2018/0063554 A1 | 3/2018 | Sham | |

OTHER PUBLICATIONS

European Search Report for EP 16 20 6298 dated May 24, 2017, all pages.
European Search Report for EP 16 20 6328 dated May 29, 2017, all pages.
European Search Report for EP 16 20 6338 dated Jun. 6, 2017, all pages.
European Search Report for EP 16 20 6345 dated May 29, 2017, all pages.
European Search Report for EP 16 20 6351 dated Jun. 9, 2017, all pages.
U.S. Appl. No. 15/341,797, filed Nov. 2, 2016, Non-Final Rejection dated Jan. 27, 2017, all pages.
U.S. Appl. No. 15/341,797, filed Nov. 2, 2016, Final Rejection dated May 10, 2017, all pages.
U.S. Appl. No. 15/341,809, filed Nov. 2, 2016, Non-Final Rejection dated Dec. 30, 2016, all pages.
U.S. Appl. No. 15/341,809, filed Nov. 2, 2016, Notice of Allowance dated Jun. 16, 2017, all pages.
U.S. Appl. No. 15/341,813, filed Nov. 2, 2016, Non-Final Rejection dated Jan. 31, 2017, all pages.
U.S. Appl. No. 15/341,813, filed Nov. 2, 2016, Final Rejection dated Aug. 29, 2017, all pages.
U.S. Appl. No. 15/341,818, filed Nov. 2, 2016, Non-Final Rejection dated Jan. 27, 2017, all pages.
U.S. Appl. No. 15/341,818, filed Nov. 2, 2016, Final Rejection dated Aug. 10, 2017, all pages.
U.S. Appl. No. 15/341,824, filed Nov. 2, 2016, Non-Final Rejection dated Mar. 16, 2017, all pages.
U.S. Appl. No. 15/341,824, filed Nov. 2, 2016, Notice of Allowance dated Jul. 18, 2017, all pages.
U.S. Appl. No. 15/341,831, filed Nov. 2, 2016, Non-Final Rejection dated Jan. 13, 2017, all pages.

(56) References Cited

OTHER PUBLICATIONS

U.S. Appl. No. 15/341,831, filed Nov. 2, 2016, Notice of Allowance dated May 23, 2017, all pages.
U.S. Appl. No. 15/341,797, filed Nov. 2, 2016, Non-Final Rejection dated Dec. 14, 2017, all pages.
Notice of Allowance dated Jun. 7, 2018 in the corresponding U.S. application (U.S. Appl. No. 15/794,529).
Final Office Action dated May 23, 2018 in the corresponding application (U.S. Appl. No. 15/341,797).

* cited by examiner

FACILITATING LOCATION POSITIONING SERVICE THROUGH A UAV NETWORK

CROSS-REFERENCE TO RELATED APPLICATIONS

The present application is a continuation of U.S. Nonprovisional application Ser. No. 15/341,831, filed on Nov. 2, 2016, which claims priority to U.S. Provisional Application No. 62/274,112, filed on Dec. 31, 2015, the disclosures of each of which are hereby incorporated by reference in their entirety for all purposes.

The present application is related to the following co-pending U.S. Nonprovisional Patent Applications: U.S. Nonprovisional application Ser. No. 15/341,809, filed on Nov. 2, 2016; U.S. Nonprovisional application Ser. No. 15/341,818, filed on Nov. 2, 2016; U.S. Nonprovisional application Ser. No. 15/341,824, filed on Nov. 2, 2016; and U.S. Nonprovisional application Ser. No. 15/341,831, filed on Nov. 2, 2016. The entire disclosures of each of these applications are hereby incorporated by reference in their entireties for all purposes.

BACKGROUND

The present disclosure relates to providing positioning service, in particular providing location information of a transportation apparatus via a UAV network.

An unmanned aerial vehicle (UAV), commonly known as a drone and also referred by several other names, is an aircraft without a human pilot aboard. The flight of UAVs may be controlled either autonomously by onboard computers or by the remote control of a pilot on the ground or in another vehicle. UAVs have mostly found military and special operation applications, but also are increasingly finding uses in civil applications, such as policing, surveillance and firefighting, and nonmilitary security work, such as inspection of power or pipelines. UAVs are adept at gathering an immense amount of visual information and displaying it to human operators. However, it can take a great deal of time and manpower to interpret the information gathered by UAVs. In many cases, the information gathered by UAVs is misinterpreted by human operators and analysts who have a limited time window in which to interpret the information.

Location positioning system LPS is generally known in the art. Unlike GPS or other global navigation satellite systems, conventional local positioning systems don't provide global coverage. Instead, they use a set of beacons which have a limited range, hence requiring the user to be nearby. The beacons typically include cellular base stations, Wi-Fi access points, and radio broadcast towers. Nowadays, local positioning systems are often used as complementary positioning technology to GPS, especially in areas where GPS does not reach or is weak, for example, inside buildings, or urban canyons. Local positioning using cellular and broadcast towers can be used on cell phones that do not have a GPS receiver. Even if the phone has a GPS receiver, battery life will be extended if cell tower location accuracy is sufficient. Traditional LPS typically involve one of the following technologies: triangulation, trilateration, and multilateration.

SUMMARY

Embodiments are provided for providing location positioning service for locating a transportation apparatus through a UAV network. For achieving this, a location center may be employed. The location center may be connected to a location database configured to store location information regarding transportation apparatuses. The location center may be configured to receive a location service request for locating a specific transportation apparatus. After receiving such a request, the location center may inquire the location database for last known location of the requested transportation apparatus. Based on the last known location of the requested transportation apparatus, the location center may predict one or more areas in which the requested transportation apparatus may be currently in. Based on the prediction, the location center may be configured to generate one or more control instructions to one or more UAVs in the UAV network to locate the requested transportation apparatus in those areas.

After receiving the aforementioned control instructions from the location center, the one or more UAVs can be configured to search for the requested transportation apparatus in the areas covered by the one or more UAVs. In one implementation, the UAVs may be configured to send signals, such as beacons, to transportation apparatuses for their identities and locations within those areas and in response to the answers from the transportation apparatuses, determine which one of those transportation apparatuses is the requested transportation apparatus. In another implementation, the UAVs may be configured to stationed on corresponding segments of roads with the areas and take pictures of transportation apparatuses passing through those segments. The UAVs can be to configured to transmit the images to a controller or the location center for determining a license plate matching the requested transportation apparatus.

After the requested transportation apparatus is located by the UAVs, the location center may be configured to instruct the UAVs to provide updated locations of the transportation apparatus, for example once every 5 minutes. For achieving this, the UAVs may be instructed to follow the requested transportation apparatus, and obtain updated location of the transportation apparatus as requested by the location center. The location center can be configured to store the updated location of the requested transportation apparatus in the location database mentioned above.

In some implementations, the location center can be configured to predict one or more areas a requested transportation apparatus is currently in. For example, a location request received by the location center may indicate a last known location of the requested transportation apparatus, a last known speed of the requested transportation apparatus, a last known direction of the transportation apparatus, and/or any other relevant information about the requested transportation apparatus. Based on such information, the location center can predict one or more areas the requested transportation apparatus may be currently in. In that example, the location center can then be configured to determine which UAVs may be deployed to locate the requested transportation apparatus based on the areas covered by those UAVs.

As compared to the traditional LPS mentioned above, the technologies provided in the present disclosure can locate a moving transportation apparatus without requiring the transportation apparatus be near a beacon such as a cell tower, or requiring the moving transportation apparatus to be trackable through GPS. One application of the technologies provided in the present disclosure can be for law enforcement, where the requested transportation apparatus often tries to evade tracking by turning off GPS or traveling through minor routes without cell coverage. The technologies provided in the present disclosure solve this problem by employing UAVs to track the requested transportation apparatus in open field that is very difficult for the transportation apparatus to evade when it is moving on the ground.

Other objects and advantages of the invention will be apparent to those skilled in the art based on the following drawings and detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
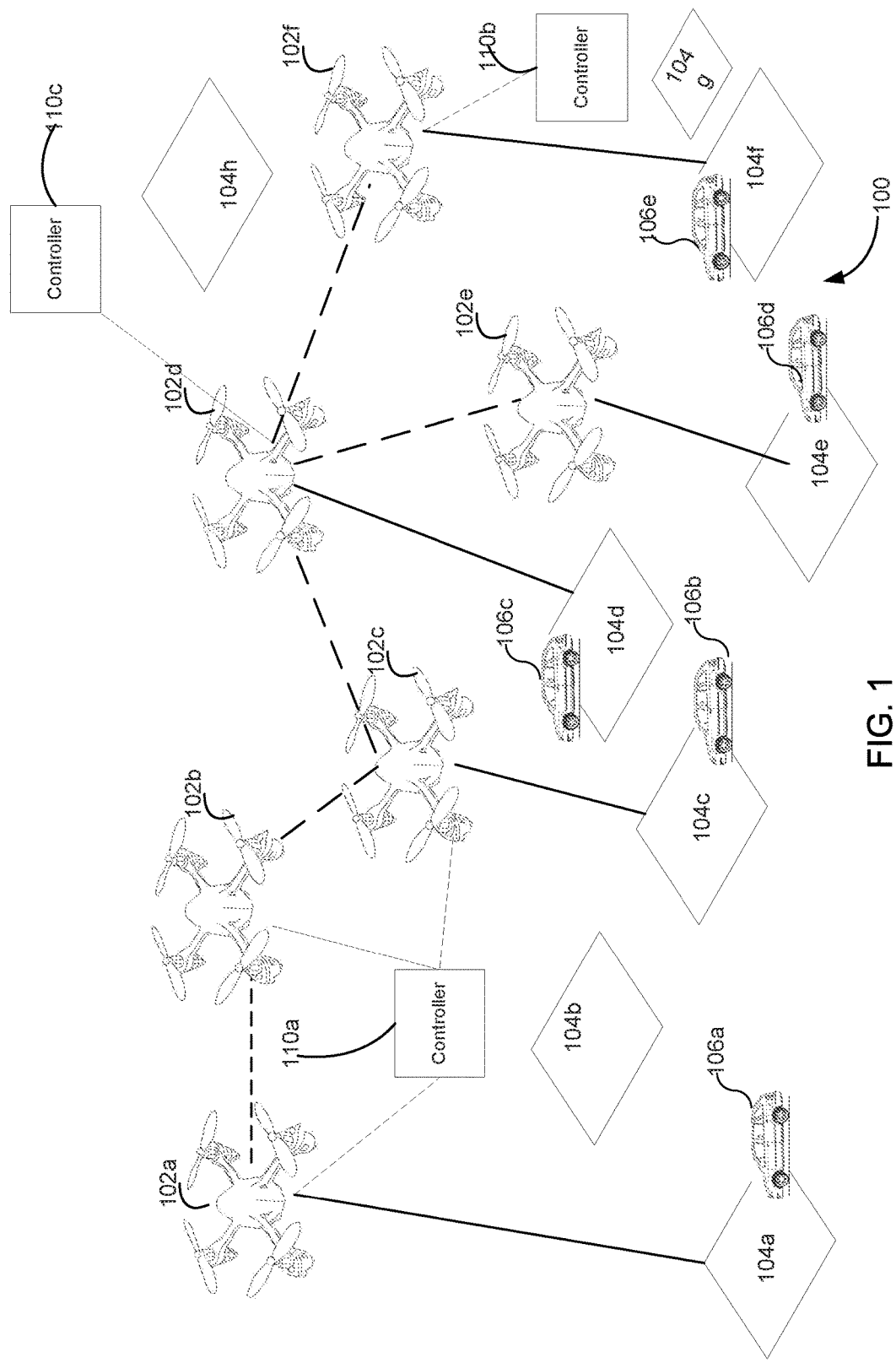
FIG. 1 illustrates an exemplary UAV network in accordance with the disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

Various specific embodiments of the present disclosure will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

UAVs are well suited for applications where the payload consists of optical image sensors such as cameras with powerful lightweight sensors suited for a variety of commercial applications such as surveillance, video conferencing, vehicle positioning, and/or any other applications. A UAV in accordance with the disclosure can collect multispectral imagery of any object in an area covered the UAV.

In certain embodiments, the UAV in accordance with the disclosure can fly up to 65,000 feet and can cover as much as 500 km in range. One motivation of the present disclosure is to employ UAVs to facilitate video-conferencing involving at least one transportation apparatus, such as an automobile, a bus, or a train. One or more UAVs can be employed to capture video images of an interior of the transportation apparatus, such as a cabin of the transportation apparatus. Since UAV can be configured to move at a speed consistent with a speed of the transportation apparatus above the transportation apparatus, video images of the transportation apparatus can be restively simply captured by the UAV when the transportation apparatus moves.

Another advantage of using the UAV to capture video images of a moving transportation apparatus is that the UAV equipped with a wide-view, e.g., 360 degree, camera, can be used to capture wide-view video images of an interior of the transportation apparatus so along as there is clear view of the interior of the transportation apparatus from the UAV. The images can be transmitted from the UAV to a processing center via the UAV network. The processing center can be configured to obtain information regarding the transportation apparatus, such the make of the transportation apparatus, one or more registration numbers of the transportation apparatus in response to receiving the images of the transportation apparatus. In some implementations, the processing center can be further configured to analyze the images to obtain passenger information and/or driver information regarding one or more passengers and/or drivers in the transportation apparatus. The passenger information can include information indicating a gender of each passenger, an age group of each passenger, an identity of each passenger, a position of each passenger within the transportation apparatus, and/or any other passenger information. The driver information can include similar information regarding the driver. Based on the passenger information and/or driver information, and the information related to the transportation apparatus, the processing center can be configured to determine one or more items to be presented to the passengers and/or the driver within the transportation apparatus. For example, based on the passenger information, the processing center can determine an age group of the passengers sitting in a back row of the transportation apparatus and determine to present local marketing items that might be of interest to the passengers.

As used herein, transportation apparatus may be referred to as an apparatus capable of moving in distance for transportation of people and/or goods. Examples of a transportation apparatus may include a vehicle (e.g., a car or truck), a bike, a motorcycle, a train, a ship, a plane or a space ship, just to name view. It should be understood, in the examples given below, although vehicle is used in those examples, this is not intended to be limiting. Other type of transportation apparatus may also be used in those examples in some embodiments.

FIG. 1 illustrates an exemplary UAV network 100 for facilitating communications for a vehicle in accordance with the disclosure. As shown, the UAV network 100 can comprise multiple UAVs 102, such as UAVs 102a-f. It should be understood the UAV network 100, in certain embodiments, can comprise hundreds, thousands, or even tens of thousands of UAVs 102. The individual UAVs 102 in UAV network 100, such as UAV 102a, can fly above the ground, between 50,000 to 65,000 feet altitude. However, this is not intended to be limiting. In some examples, some or all of the UAVs 102 in the UAV network 100 can fly at hundreds or thousands feet above the ground. As shown, the individual UAVs 102 in the UAV network 100 can communicate with each other through communication hardware carried by or installed on UAVs 102. For example, the communication hardware onboard a UAV 102 can include an antenna, a high frequency radio transceiver, an optical transceiver, and/or any other communication components for long range communications. A communication channel between any two given UAVs 102 in UAV network 100, for example, UAV 102c and UAV 102d, can be established.

One way of establishing a communication channel between any two given UAVs is to have them autonomously establish the communication channel through the communication hardware onboard the two given UAVs 102. In this example, UAVs 102a, 102b and 102c are neighboring UAVs such that they cover neighboring areas 104a, 104b, and 104c respectively. They can be configured to communicate with each other once they are within a threshold distance. The threshold distance can be the maximum communications range of the transceivers onboard the UAVs 102a, 102b, and 102c. In this way, UAVs 102a, 102b, and 102c can send data to each other without an access point.

Another way of establishing a communication channel between any two given UAVs 102 in UAV network 100 is to have them establish communication channel through a controller. As used herein, a controller may be referred to as a piece of hardware and/or software configured to control communications within UAV network 100. The controller can be provided by a ground processing station, such as ground controller 110a, 110b, or 110c. For instance, the controller 110 can be implemented by a computer server housed in a controller 110. In certain embodiments, the controller 110 can be provided by a UAV 102 in the UAV network 100. For instance, a given UAV 102, such as an unmanned helicopter or a balloon, in the UAV network 100 can carry payloads including one or more of a processor configured to implement the controller 110. In any case, the controller 110 can be configured to determine network requirements based on an application supported by UAV network 100, and/or to perform any other operations. In implementations, control signals can be transmitted via a control link from the controller 110 to the UAVs 102 shown in FIG. 1.

As mentioned above, an important criteria to a UAV 102 in the network is altitude. However, as the UAV 102 altitude increases, the signals emitted by UAV 102 become weaker.

A UAV 102 flying at an altitude of 65,000 feet can cover an area up to 100 kilometers on the ground, but the signal loss can be significantly higher than would occur for a terrestrial network. Radio signals typically require a large amount of power for transmission in long distance. On the other end, the payloads can be carried by a UAV 102 that stays in the air for an extended period of time is limited. As mentioned above, solar energy can be used to power the UAV 102. However this limits the weight of payloads that can be carried by a UAV 102 due to the limited rate at which solar irritation can be absorbed and converted to electricity.

Free-space optical communication (FSO) is an optical communication technology that transmits light in free space to wirelessly transmit data for telecommunications. Commercially available FSO systems use wave length close to visible spectrum around 850 to 1550 nm. In a basis point-to-point FSO system, two FSO transceivers can be placed on both sides of transmission path that has unobstructed line-of-sight between the two FSO transceivers. A variety of light sources can be used for the transmission of data using FSO transceivers. For example, LED and laser can be used to transmit data in a FSO system.

Lasers used in FSO systems provide extremely high bandwidths and capacity, on par with terrestrial fiber optic networks, but they also consume much less power than microwave systems. A FSO unit can be included in the payloads of a UAV 102 for communication. The FSO unit can include an optical transceiver with a laser transmitter and a receiver to provide full duplex bi-directional capability. The FSO unit can use a high-power optical source, i.e., laser, and a lens to transmit the laser beam through the atmosphere to another lens receiving the information embodied in the laser beam. The receiving lens can connect to a high-sensitivity receiver via optical fiber. The FSO unit included in a UAV 102 in accordance with the disclosure can enable optical transmission at speeds up to 10 Gbps.

Also shown in FIG. 1 are vehicles 106a-f. A given vehicle 106 can be equipped with communication hardware. The communication hardware in the given vehicle 106 can include a FSO unit described above, a radio transceiver, and/or any other type of communication hardware. The communication hardware included in the vehicle 106 can be used to establish a communication channel between the vehicles 106 via the UAVs 102. A controller 110 can include a FSO unit configured to establish a communication channel FSO unit through laser beam. Through the communication channel, UAV 102 can be configured to communicate its geo-locations to controller 110. Since ground controller 110 is stationary, the geo-location of ground controller 110 can be preconfigured into an onboard computer in UAVs 102. Through the ground controller 110, information intended for vehicle 106 can be forwarded to vehicle 106. The ground controller 110 can be connected to a wired or wireless network. Information intended for vehicle 106 can be communicated through the wired or wireless network from or to another entity connected to the wired or wireless network. The information intended for vehicle 106 can be first communicated to the UAV 102 through laser beam, and the UAV 102 can forward the information to vehicle 106 through laser beam 204a.

In implementations, for locating a vehicle 106, a tracking signal can be transmitted from UAV 102 for tracking vehicle 106. The tracking signal can be in various forms. For example, the UAV 102 may scan the covered area 104 with a camera onboard UAV 102 in a pre-determined pattern. For example, the UAV 102 may scan the covered area 104 in a scan line fashion from on one corner of the covered area 104 to the opposite corner of the covered area 104. As another example, the UAV 102 may scan the covered area 104 in a concentric sphere fashion starting from an outer sphere within the covered area 104, gradually into inner spheres within the covered area 104 until the center of the covered area 104. Still as another example, the UAV 102 may scan the covered area along predefined lines of areas 104, for example a portion of a road that enters area 104 and another portion of the road that exits area 104. In certain embodiments, the UAV 102 may carry a radio transmitter configured to broadcast in radio signals within the covered area 104. In those examples, the broadcast radio signals can serve as tracking signals such that once they are intercepted by a vehicle 106 passing through the covered area 104, the UAV 102 can be configured to location a position of the vehicle 106 within the covered area 104.

An identification of the vehicle 106 can be captured after the vehicle 106 has been tracked by UAV 102. In certain implementations, the identification of the vehicle 106 can be captured by a camera carried by the UAV 102. For example, the UAV 102 may be configured to capture a picture of a license plate of vehicle 106 once it has been tracked. As another example, the UAV 102 may be configured to transmit a request to vehicle 106 to inquire about its identification, and the vehicle 106 can send its identification to the UAV 102 in response to the request.

Any one of the UAVs 102 shown in FIG. 1 may be instructed to "monitor" or "zoom-in onto" a corresponding vehicle 106. For example, the UAV 102a may receive location information regarding vehicle 106a and instructions to zoom-in onto vehicle 106a. In that example, in response to receiving such location information and instructions, the UAV 102a may be configured to track vehicle 106a based on the received location information. This may involve moving the UAV 102a into a vicinity of vehicle 106a such that UAV 102a has a clear view of vehicle 106. As will be discussed below, the instructions received by UAV 102a may include capturing one or more images of interior of vehicle 106a. For achieving this, UAV 102a may be equipped with one or more cameras. In some embodiments, the camera(s) carried by UAV 102a may include a wide-view camera capable of capturing a wide field of view. In one embodiment, the wide-view camera carried by UAV 102a is an omnidirectional camera with a 360-degree field of view in a horizontal plane, or with a visual field that covers (approximately) the entire sphere.

In some embodiments, the cameras carried by UAV 102a may include multiple cameras fixed at corresponding locations on an underbody of UAV 102a. In one embodiment, the multiple cameras may be arranged on the underbody of UAV 102a to form a ring. In one configuration, 8 cameras are used to form such a ring. One or more of those cameras can be employed to capture the interior of vehicle 106a depending on a distance between UAV 102a and vehicle 106a, an angle between the two, and/or any other factors. For example, three cameras in the ring may be employed by UAV 102a to capture images of the interior of vehicle 106a from different angles. In some implementations, individual cameras carried by UAV 102a may have panoramic view capability. For example, various types of panoramic view cameras may be carried by UAV 102a, including short rotation, full rotation, fixed lens, and any other types of panoramic view cameras.

Figure 2:
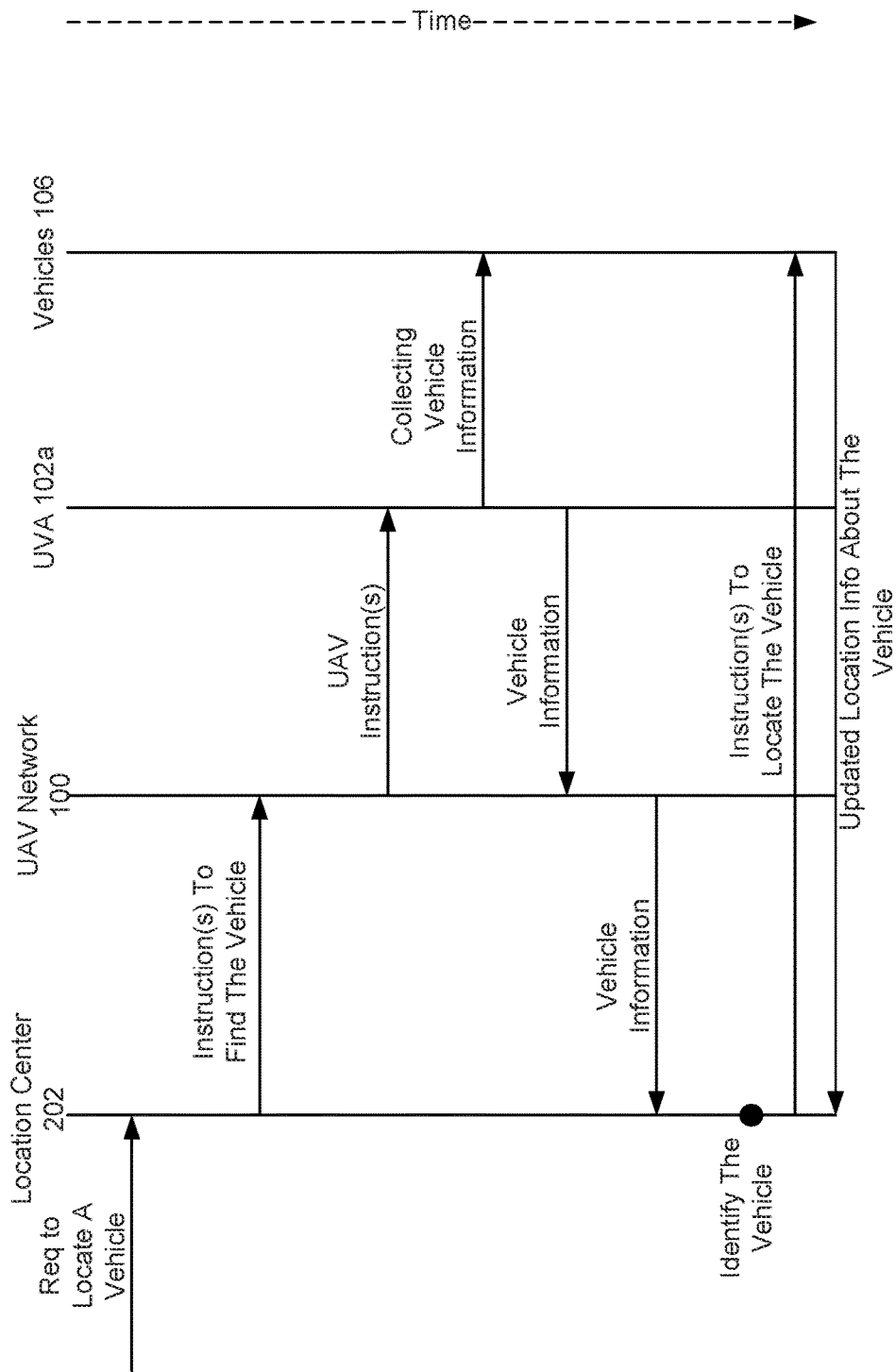
FIG. 2 conceptually illustrates locating a vehicle shown in FIG. 1 through a UAV network in accordance with the disclosure.

With UAV network 100 having been generally described, attention is now directed to FIG. 2, which conceptually illustrates locating a vehicle, such as vehicle 106a shown in FIG. 1, through a UAV network in accordance with the disclosure. As shown, the location services in accordance with the disclosure may involve a location center 202. The location center 202 can be configured to provide a location of a given vehicle upon a request. For example, the location center 202 may be operatively connected to a computer system of law enforcement, such as a police department. In some implementations, the location center 202 may be independently operated by a provider. For example, the location center 202 may be operated by a commercial location service provider that can be used to assist an entity or a person to locate a vehicle. In any case, as shown, the location center 202 can be configured to receive a request from a user system, such as the computer system of a police department, to locate the vehicle 106a. In some implementations, the request for locating the vehicle 106a can include identity information regarding the vehicle 106a. For example, the identity information may indicate a license plate number of the vehicle 106a, a build and make of vehicle 106a, a color of vehicle 106a, and/or any other identity information regarding vehicle 106a. It should be understood that license plate information or other type of registration information about vehicle 106a is not required for locating the vehicle 106a. In some embodiments, the location center 202 can be configured to locate the vehicle 106 just based on the build and make and/or color of the vehicle 106a when the last known location information regarding the vehicle 106a is included in the request.

As mentioned above, in some implementations, the request received by the location center 202a may include last known location information regarding the vehicle 106a. The last known location information can include information indicating a last known geolocation (e.g., in city A, at intersection Y and X, at highway Z, or simply a geographic coordinate), a last known speed (e.g, 70 mile/hour), a last known direction (e.g., traveling towards south), a timestamp of the last known information in the request (e.g., a specific time at which vehicle 106a was seen), and/or any other information.

Of course, the request received by the location center 202a may not necessarily include the last known location information regarding vehicle 106a. In some implementations, the location center 202 may be operatively connected to a location database configured to store location information regarding individual vehicles 106. In those implementations, the location center 202 may be configured to communicate with location database to obtain last known location information regarding vehicle 106 after receiving the request. In some implementations, the location center 202 may be configured to determine whether the request received includes last known information regarding vehicle 106a. In those implementations, the location center 202 can be configured to communicate with the location database in response to determining the last known information is not included in the request.

In some embodiments, based on the last known location information, e.g., either included in the request received by the location center 202 or obtained from the location database, the location center 202 can be configured to generate an instruction instructing one or more UAVs to find vehicle 106a. For example, the last known location information may indicate that vehicle 106a was last seen at certain location (e.g., an intersection at certain block in the city or at specific geographical coordinates), the location center 202 can determine which one or ones of UAVs in the UAV network 100 may be deployed to find the vehicle 106a. For instance, the location center 202 may determine UAVs that are monitoring an area centered on the last seen location with a radius 10 miles from the last seen location can be deployed to find the vehicle 106a.

In some implementations, the location center 202 may be configured to examine a timestamp of last known location information regarding vehicle 106a. In those implementations, the location center 202 can be configured to compare the timestamp with a preset threshold to determine if the last known location of the vehicle 106a is too old to effectively find vehicle 106a. For example, the preset threshold may be a 5 minute window such that if the timestamp of the last known location vehicle 106a is older than 5 minutes, the location center 202 may not use the last known location information of the vehicle 106a to determine which one or ones of UAVs to find vehicle 106a.

In some implementations, the location center 202 can be configured to predict one or more areas where the vehicle 106a may be currently in based on the last known location information regarding vehicle 106a. For example, the location center 202 can be configured to calculate a distance traveled by vehicle 106a based on the last seen location, the last known speed, the last know direction, the timestamp of the last known location information, and/or any other information regarding vehicle 106a. Based on this distance, the location center 202 can then determine a possible new current location for the vehicle 106a. With the possible current new location for vehicle 106a determined, the location center 202 can then be configured to draw a radius from that location to form a possible new area in which the vehicle 106a may be currently traveling in.

In some examples, multiple possible new current locations can be predicted by the location center 202. For example, based on the last known location information regarding vehicle 106a, several possible new current locations may be determined using the speed and direction of the vehicle 106a indicated by the last known location information regarding vehicle 106a. For instance, the last known location information may indicate vehicle 106a was last seen at location X, the last known speed of vehicle 106a was at 70 miles an hour and was traveling south, and the timestamp of the last known location information is 25 minutes before the current time. In that instance, the location center 202 may be configured to determine a number of possible routes leading to south from location X. As illustration, if there are four possible routes from location X leading to south, then the location center 202 can be configured to determine 4 possible new current locations for vehicle 106a based on the last known speed and the timestamp of last known location information regarding vehicle 106a. Using the 4 new possible current locations, the location center 202 can be configured to draw four possible areas vehicle 106a may be currently traveling in as described above.

In any case, after the location center 202 obtained one or more possible new areas vehicle 106a is traveling in, either by prediction or from the request as described above, location center 202 can generate one or more instructions instructing one or more UAVs to find the vehicle 106a in one of those areas. This may involve determining which one or ones of UAVs may be deployed in each of those areas to find vehicle 106a. For example, the location center 202 may maintain a list of UAVs and areas covered by those UAVs, and based on the one or more possible new current locations, the location center 202 can be configured to select one or more UAVs from the list. After selecting the UAVs, the location center 202 may be configured to determine one or more means to communicate with the selected UAVs for instructing them to find vehicle 106a. In some implementations, the location center 202 may determine one or more of a UAV controller, such as controller 110a, for communicating the instructions to the selected UAVs. In some implementations, the location center 202 may not determine specific UAVs for finding the vehicle 106a in the possible new areas predicted, but rather communicating instructions to find vehicle 106a with the UAV controllers covering those areas and let the UAV controllers determine specific UAVs for finding the vehicle 106a in those areas. In those implementations, the UAV controllers can be configured to perform the UAV selection described above.

In any case, the location center 202 can communicate the instruction to a specific UAV, such as UAV 102a to find vehicle 106 through the UAV network 100, either directly or via a UAV controller. After receiving the instruction, the UAV 102a can be configured to be deployed to a possible new area the vehicle 106a is currently traveling in. For example, when the UAV controller is involved, the UAV controller can be configured to determine how many UAVs under its control may be deployed and where to deploy them to find vehicle 106a. For example, the UAV controller in that example may be configured with an area map, and based on the area map, the UAV controller can determine specific number of UAVs to be deployed on different segments of the roads within the area. The UAV controller can then generate an instruction to each UAV to deploy the UAV to a corresponding segment of the road to monitor the traffic for finding vehicle 106a. As mentioned above, the UAVs in network 100 can be configured to track individual vehicle 106a using a number of ways, such as beacon and/or image capturing.

Figure 3:
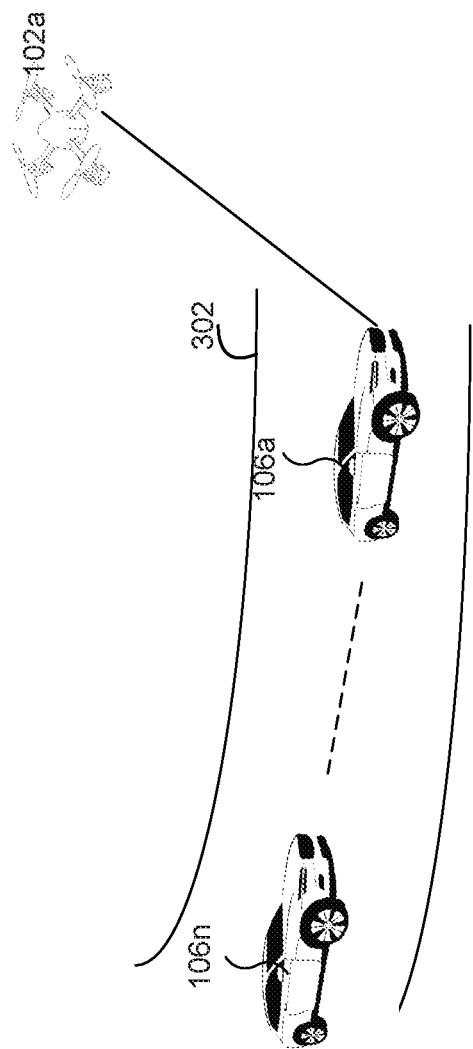
FIG. 3 illustrates one example of a UAV is deployed to a segment of road to monitor incoming traffic.

FIG. 3 illustrates one example of a UAV 102a is deployed to a segment of road 302 to monitor incoming traffic. As shown, UAV 102a may be configured to send a beacon to each vehicle 106 entering into zone of sight inquiring about its identity. The vehicles, such as vehicle 106a -n as shown, can be configured to respond to such an inquiry with their identify information. However, as mentioned above, such a simple way of tracking each individual vehicle 106 on road 302 may not necessarily be adequate, especially when vehicle 106a turns off its location or responder system. Taking such situations into considerations, the UAV 102a in some implementations can be configured to capture images of those vehicles 106 that are not responding to the beacon inquiry. For example, the UAV 102a may be configured to take an image of a front panel of the incoming vehicle 106 that is not responding to the beacon inquiry. The images can be processed, for example, by the location center 202 to determine the identity of the non-responding vehicle 106.

Referring back to FIG. 2, after collect the information regarding a given vehicle 106, such as an answer from the given vehicle 106 or an captured image of vehicle 106, the UAV 102a may be configured to transmit such vehicle information back to location center 202 through UAV network 100, either directly or via a UAV controller. After receiving the vehicle information, the location center 202 may be configured to analyze the information for the given vehicle 106 corresponding to the information. For example, if the information contains an answer from the given vehicle 106 identifying itself, location center 202a may determine whether the given vehicle 106 is vehicle 106a. As mentioned above, the information may in some examples contain imagery information regarding the given vehicle 106. In those examples, the location center 202 may be configured to analyze the imagery information to, for example, determine a license plate number of the given vehicle 106, and determine whether the given vehicle 106 is the vehicle 106a based on the determined license plate number.

As still shown in FIG. 2, after the location center 202 identifies a given vehicle 106 is indeed the vehicle 106a, the location center 202 may be configured to generate one or more instructions instructing the UAVs that collected the information of the vehicle 106a to follow vehicle 106a and provide up to date location of vehicle 106a periodically until further notice. Such instructions can be similarly communicated to the UAVs through the UAV network 100, either directly or via the UAV controller.

At the UAV that receives the instructions from the location center 202 to follow vehicle 106a, the UAV, such as UAV 102a, can be configured to follow the vehicle 106a turn by turn and provide the UAV location (hence the vehicle 106's location) back to the location center 202 periodically, e.g., every minute, 5 minutes, 10 minutes or any other frequency. After receiving the updated location of vehicle 106a from the UAV 102a, the location center 202 can be configured to transmit the updated location to the user system that requested such information, and/or store the updated location information regarding vehicle 106a in the location database as the last known location information for vehicle 106a.

Figure 4:
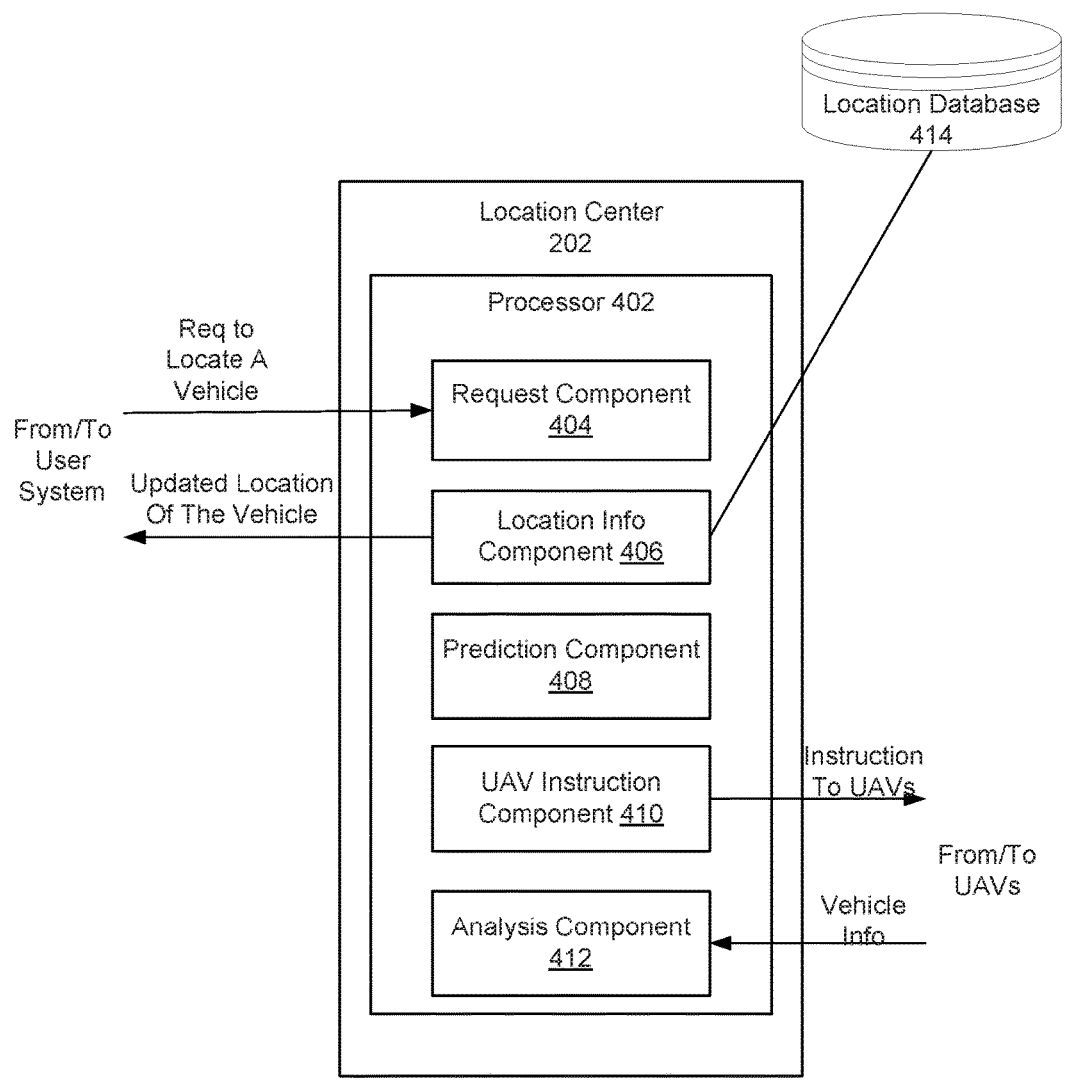
FIG. 4 illustrates an example of location center shown in FIG. 2 in accordance with the disclosure.

Attention is now directed to FIG. 4, where an example of location center 202 is shown. As shown, the location center 202 may include one or more of a processor 402 configured to execute program components. The program components may include a request component 404, a location information component 406, prediction component 408, a UAV instruction information component 410, an analysis component 412 and/or any other components. The request component 404 can be configured to receive a request from a user system, such as the computer system of a police department, to locate a given vehicle, such as vehicle 106a. In some implementations, the request received by request component 404 for locating the vehicle 106a can include identity information regarding the vehicle 106a. For example, the identity information may indicate a license plate number of the vehicle 106a, a build and make of vehicle 106a, a color of vehicle 106a, and/or any other identity information regarding vehicle 106a. In some implementations, the request received by request component 404 may include last known location information regarding the vehicle 106a. The last known location information can include information indicating a last known geolocation (e.g., in city A, at intersection Y and X, at highway Z, or simply a geographic coordinate), a last known speed (e.g, 70 mile/hour), a last known direction (e.g., traveling towards south), a timestamp of the last known information in the request (e.g., a specific time at which vehicle 106a was seen), and/or any other information.

The location information component 406 can be configured to obtain the last known location of the vehicle, such as vehicle 106a, as indicated in the request received by request component 404. As mentioned above, in some examples, the request received by the request component 404 may already include the last known location information regarding vehicle requested. However, in some examples, the request may not include such information. The request component 404 can be configured to communicate with a location database, such as the location database 414 as shown, to obtain last known location information regarding vehicle 106a.

In some implementations, the location information component 406 may be configured to determine whether the request received includes last known information regarding vehicle 106a. In those implementations, the location center 202 can be configured to communicate with the location database 414 in response to determining the last known information is not included in the request. In some implementations, the location information component 406 may be configured to examine a timestamp of last known location information regarding vehicle 106a as included in the request received by request component 404 or as retrieved from the location database 414. In those implementations, the request component 404 can be configured to compare the timestamp with a preset threshold to determine if the last known location of the vehicle 106a is too old to effectively find vehicle 106a. For example, the preset threshold may be a 5 minute window such that if the timestamp of the last known location vehicle 106a is older than 5 minutes, the location information component 406 may not use the last known location information of the vehicle 106a as included in the received request to determine which one or ones of UAVs to find vehicle 106a.

The prediction component 408 can be configured to predict one or more areas where the vehicle 106a may be currently in based on the last known location information obtained by the location information component 406. For example, the prediction component 408 can be configured to calculate a distance traveled vehicle 106a based on the last seen location, the last known speed, the last know direction, the timestamp of the last known location information, and/or any other information. Based on this distance, the prediction component 408 can then determine a new possible current location for the vehicle 106a. With the new possible current location for vehicle 106a determined, the prediction component 408 can then be configured to draw a radius from that location to form a possible new area in which the vehicle 106a is currently traveling in.

In some examples, multiple possible current locations can be predicted by the prediction component 408. For example, based on the last known location information regarding vehicle 106a, several new possible current locations may be determined using the speed and direction of the vehicle 106a indicated by the last known location information regarding vehicle 106a. For instance, the last known location information may indicate vehicle 106a was last seen at location X, the last known speed of vehicle 106a was at 70 miles an hour and was traveling south, and the timestamp of the last known location information is 25 minutes before the current time. In that instance, the prediction component 408 may be configured to determine a number of possible routes leading to south from location X. For illustration, if there are four possible routes from location X leading to south, then the prediction component 408 can be configured to determine 4 possible new current locations for vehicle 106a based on its last known speed and the timestamp of last known location information. Using the 4 new possible current locations, the location center 202 can be configured to draw four possible areas vehicle 106a may be currently traveling in as described above.

The UAV instruction component 410 can be configured to generate one or more instructions instructing one or more UAVs to find the vehicle 106a in the areas predicted by the prediction component 408. This may involve determining which one or ones of UAVs may be deployed in each of those areas to find vehicle 106a. For example, the UAV instruction component 410 may maintain a list of UAVs and areas covered by those UAVs, and based on the one or more possible new current locations, the UAV instruction component 410 can be configured to select one or more UAVs from the list. After selecting the UAVs, UAV instruction component 410 may be configured to determine one or more means to communicate with the selected UAVs for instructing them to find vehicle 106a. In some implementations, the UAV instruction component 410 may determine one or more of a UAV controller, such as controller 110a, for communicating the instructions to the selected UAVs. The UAV instruction component 410 can be configured to communicate the generated instruction to a specific UAV, such as UAV 102a to find vehicle 106 through the UAV network 100, either directly or via a UAV controller.

The analysis component 412 can be configured to receive vehicle information collected by UAVs and analyze the information for identifying a given vehicle. For example, if the information contains an answer from the given vehicle 106 identifying itself, analysis component 412 may determine whether the given vehicle 106 is vehicle 106a. As mentioned above, the information received by the analysis component 412 may in some examples contain imagery information regarding the given vehicle 106a. In those examples, the analysis component 412 may be configured to analyze the imagery information to, for example, determine a license plate number of the given vehicle 106, and determine whether the given vehicle 106 is the vehicle 106a based on the determined license plate number.

In some implementations, the UAV instruction component 410 can be further configured to generate one or more instructions instructing the UAVs that collected the information of the given vehicle to follow that vehicle and provide up to date location of that vehicle periodically until further notice. Such instructions can be similarly communicated by the UAV instruction component 410 to the UAVs through the UAV network 100, either directly or via the UAV controller.

In some implementations, the location information component 406 can be further configured to transmit the updated location of the given vehicle 106 to the user system that requested such information, and/or store the updated location information regarding that vehicle 106a in the location database 414 as the last known location information for that vehicle.

Figure 5:
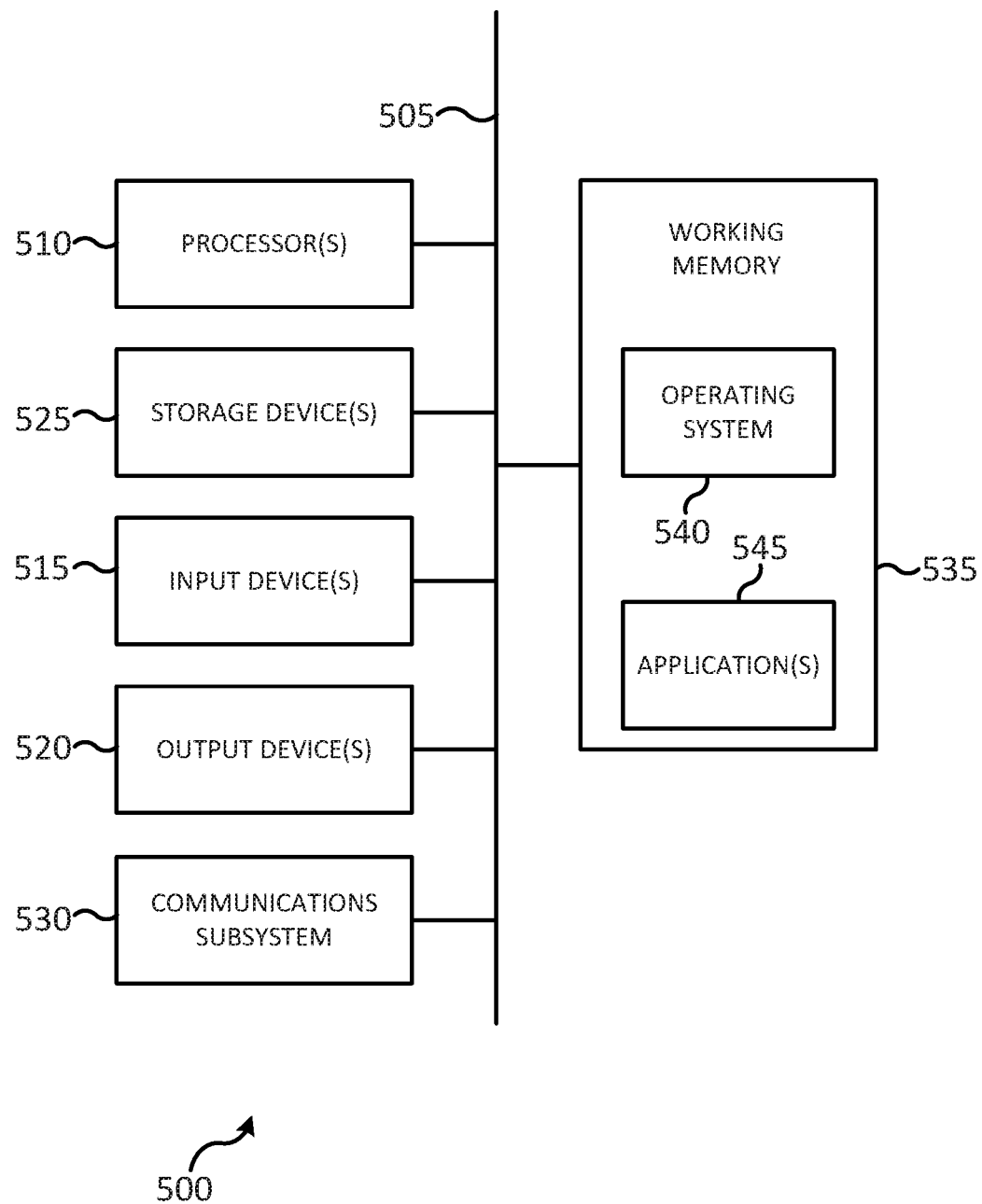
FIG. 5 illustrates a simplified computer system that can be used implement various embodiments described and illustrated herein.

FIG. 5 illustrates a simplified computer system that can be used implement various embodiments described and illustrated herein. A computer system 500 as illustrated in FIG. 5 may be incorporated into devices such as a portable electronic device, mobile phone, or other device as described herein. FIG. 5 provides a schematic illustration of one embodiment of a computer system 500 that can perform some or all of the steps of the methods provided by various embodiments. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505, or may otherwise be in communication, as appropriate. The hardware elements may include one or more processors 510, including without limitation one or more general-purpose processors and/or one or more special-purpose processors such as digital signal processing chips, graphics acceleration processors, and/or the like; one or more input devices 515, which can include without limitation a mouse, a keyboard, a camera, and/or the like; and one or more output devices 520, which can include without limitation a display device, a printer, and/or the like.

The computer system 500 may further include and/or be in communication with one or more non-transitory storage devices 525, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device, and/or a chipset such as a Bluetooth™ device, an 502.11 device, a WiFi device, a WiMax device, cellular communication facilities, etc., and/or the like. The communications subsystem 530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 530. In other embodiments, a portable electronic device, e.g. the first electronic device, may be incorporated into the computer system 500, e.g., an electronic device as an input device 515. In some embodiments, the computer system 500 will further comprise a working memory 535, which can include a RAM or ROM device, as described above.

The computer system 500 also can include software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 5, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 525 described above. In some cases, the storage medium might be incorporated within a computer system, such as computer system 500. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 500 to perform methods in accordance with various embodiments of the technology. According to a set of embodiments, some or all of the procedures of such methods are performed by the computer system 500 in response to processor 510 executing one or more sequences of one or more instructions, which might be incorporated into the operating system 540 and/or other code, such as an application program 545, contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 525. Volatile media include, without limitation, dynamic memory, such as the working memory 535.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 530 and/or components thereof generally will receive signals, and the bus 505 then might carry the signals and/or the data, instructions, etc. carried by the signals to the working memory 535, from which the processor(s) 510 retrieves and executes the instructions. The instructions received by the working memory 535 may optionally be stored on a non-transitory storage device 525 either before or after execution by the processor(s) 510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for determining a location of a transportation apparatus through a UAV network, the method being implemented in one or more of a processor configured to execute programmed components, the method comprising:
   receiving a request to locate a transportation apparatus, the request including information regarding the transportation apparatus;
   predicting one or more areas the requested transportation apparatus can be in based on the information regarding the transportation apparatus;
   selecting a UAV for locating the requested transportation apparatus;
   instructing, through the UAV network, the selected UAV to find the requested transportation apparatus;
   receiving, through the UAV network, identification information regarding the requested transportation apparatus; and
   generating instructions to instruct, through the UAV network, the selected UAV to provide updated location information about the requested transportation apparatus.

2. The method of claim 1, wherein the transportation apparatus includes a vehicle.

3. The method of claim 1, wherein the information regarding the transportation apparatus in the request comprises transportation apparatus identity information indicating a license plate number, a make and build, and/or a color of the transportation apparatus.

4. The method of claim 1, wherein the information regarding the transportation apparatus in the request comprises a registration number of the transportation apparatus.

5. The method of claim 1, wherein instructing, through the UAV network, the selected UAV to find the requested transportation apparatus includes sending the instruction, through the UAV network, to a UAV controller.

6. The method of claim 1, wherein the identification information regarding the requested transportation apparatus as collected by the selected UAV include imagery information regarding requested transportation apparatus.

7. The method of claim 6, further comprising analyzing the imagery information regarding requested transportation apparatus to identify the requested transportation apparatus.

8. The method of claim 1, further comprising:
receiving, through the UAV network, the updated location information about the requested transportation apparatus; and
storing the updated location information about the requested transportation apparatus in the location database.

9. A system for determining a location of a transportation apparatus through a UAV network, the system comprising one or more of a processor configured to execute machine-readable instructions to cause the system to perform:
receiving a request to locate a transportation apparatus, the request including information regarding the transportation apparatus;
predicting one or more areas the requested transportation apparatus can be in based on the information regarding the transportation apparatus;
selecting a UAV for locating the requested transportation apparatus;
instructing, through the UAV network, the selected UAV to find the requested transportation apparatus;
receiving, through the UAV network, identification information regarding the requested transportation apparatus; and
generating instructions to instruct, through the UAV network, the selected UAV to provide updated location information about the requested transportation apparatus.

10. The system of claim 9, wherein the transportation apparatus includes a vehicle.

11. The system of claim 9, wherein the information regarding the transportation apparatus in the request comprises transportation apparatus identity information indicating a license plate number, a make and build, and/or a color of the transportation apparatus.

12. The system of claim 9, wherein the information regarding the transportation apparatus in the request comprises a registration number of the transportation apparatus.

13. The system of claim 9, wherein instructing, through the UAV network, the selected UAV to find the requested transportation apparatus includes sending the instruction, through the UAV network, to a UAV controller.

14. The system of claim 9, wherein the identification information regarding the requested transportation apparatus as collected by the selected UAV include imagery information regarding requested transportation apparatus.

15. The system of claim 14, wherein the processor is further caused to perform analyzing the imagery information regarding requested transportation apparatus to identify the requested transportation apparatus.

16. The system of claim 9, wherein the processor is further caused to perform:
receiving, through the UAV network, the updated location information about the requested transportation apparatus; and
storing the updated location information about the requested transportation apparatus in the location database.

* * * * *